United States Patent [19]

Dahlbacka

[11] Patent Number: 5,522,645
[45] Date of Patent: Jun. 4, 1996

[54] SEAT HAVING RETAINED CUSHION

[75] Inventor: Bruce B. Dahlbacka, Port Washington, Wis.

[73] Assignee: Milsco Manufacturing Company, Milwaukee, Wis.

[21] Appl. No.: 222,609

[22] Filed: Apr. 1, 1994

[51] Int. Cl.$^6$ ................................................. A47C 7/02
[52] U.S. Cl. ........................ 297/452.55; 297/DIG. 1; 297/DIG. 2; 297/452.14; 297/452.16; 297/452.21
[58] Field of Search ..................... 297/218, 440.11, 297/440.1, 452.14, 452.12, 452.1, 452.11, 452.16, 452.17, 452.55, 452.6, 452.21, 452.22, DIG. 1, DIG. 2, 452.57, 452.42, 452.46, 452.47, 218.4, 226, 218.5, 218.3, 218.2, 218.1, 219.1, 219.12, 228.1; 5/653

[56] References Cited

U.S. PATENT DOCUMENTS

| | | | |
|---|---|---|---|
| 811,259 | 1/1906 | Taylor | 297/452.55 |
| 2,371,954 | 3/1945 | Cunningham | 297/DIG. 2 X |
| 3,126,229 | 3/1964 | Dickerson | 297/452.55 |
| 3,223,450 | 12/1965 | Pollack | 297/445 |
| 3,717,378 | 2/1973 | Jackson | 297/DIG. 2 X |
| 3,722,950 | 3/1973 | Harnick | 297/218.1 |
| 3,823,980 | 7/1974 | Harnick | 297/455 |
| 3,841,704 | 10/1974 | Platner et al. | 297/452.55 |
| 4,519,651 | 5/1985 | Whitwam | 297/452.55 X |
| 4,555,140 | 11/1985 | Nemoto | 297/DIG. 2 X |
| 4,561,621 | 12/1985 | Hill | 248/397 |
| 4,577,907 | 3/1986 | Talmon et al. | 297/452.55 X |
| 4,836,609 | 6/1989 | Hill | 297/452 |
| 5,356,205 | 10/1994 | Calvert et al. | 297/214 X |

*Primary Examiner*—Peter M. Cuomo
*Assistant Examiner*—Milton Nelson, Jr.
*Attorney, Agent, or Firm*—Nilles & Nilles

[57] ABSTRACT

A seat including: (A) a shell including a front surface, the front surface of the shell including a channel formed in the shell, the channel including an inner wall and an outer wall and having a shape; (B) a cushion including a rear surface, the rear surface of the cushion including a ridge extending rearwardly from the cushion, the ridge (1) having a shape which compliments the shape of the channel and (2) extending into the channel; and (C) mechanical fasteners extending through the outer wall of the channel, though the ridge and into the inner wall of the channel so as to retain the cushion on the shell. The mechanical fasteners do not extend all the way through the inner wall.

20 Claims, 6 Drawing Sheets

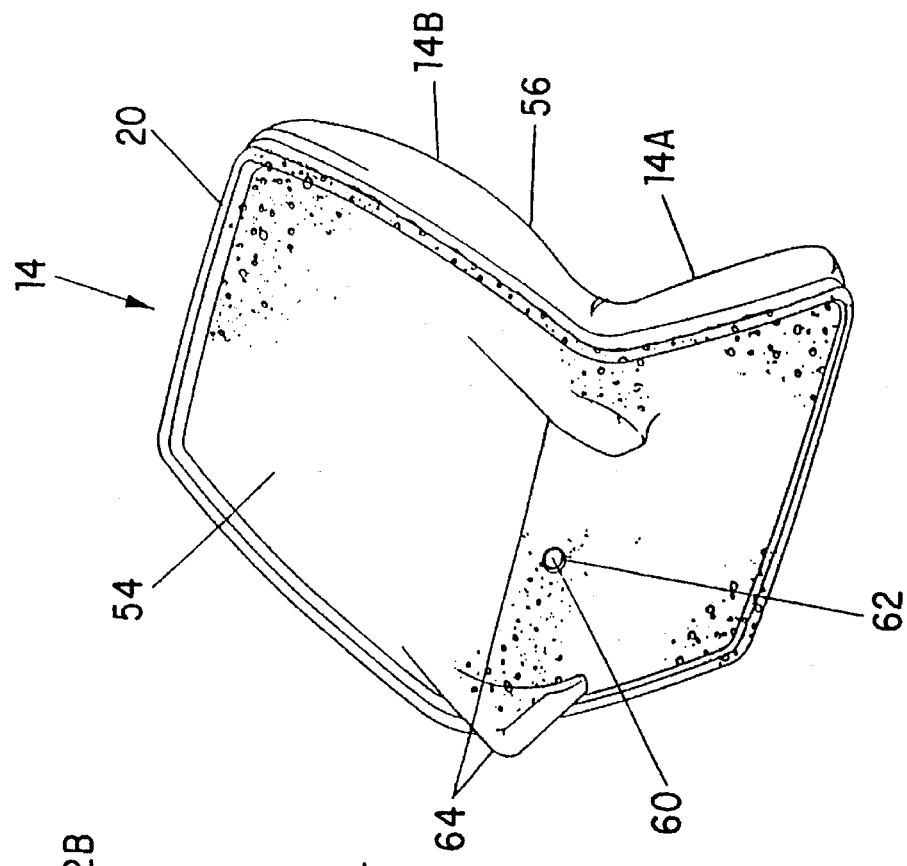
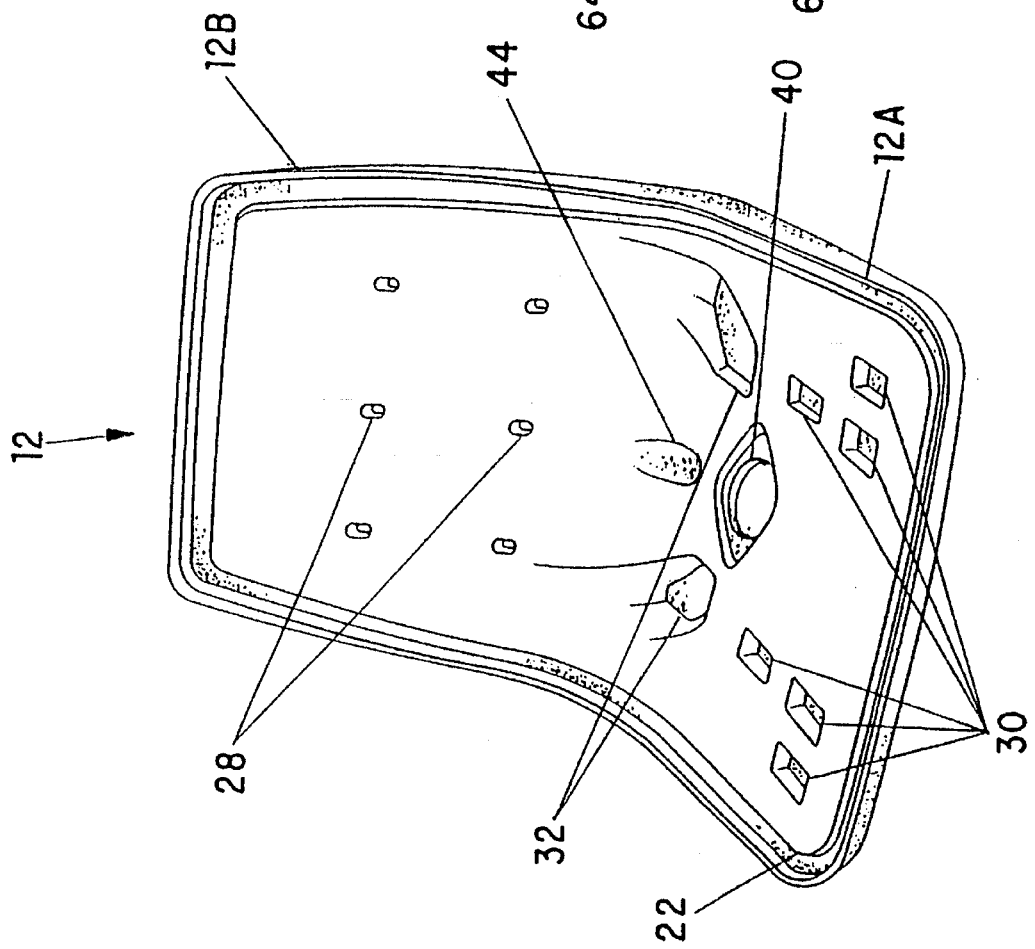

SEAT HAVING RETAINED CUSHION

BACKGROUND OF THE INVENTION

1. Field of the Invention

The invention relates to seats for use in vehicles and the like and more particularly to a cushioned seat having improved apparatus and method for retaining the cushion of such a seat on the underlying shell.

2. Description of the Related Art

Cushioned seats for use in vehicles and the like are well known. The typical such seat includes a shell on which is retained an upholstered cushion. Many consumers desire a "unitary" seat appearance in which the apparatus via which the cushion is connected to the underlying shell is not readily visible. Such a construction is not only aesthetically pleasing but also tends to be relatively durable.

A seat of this type is proposed in U.S. Pat. No. 4,836,609 to Hill (the Hill patent). The seat disclosed in the Hill patent includes a shell having a seat portion and a backrest portion and a cushion having complimentary seat and backrest portions. The cushion is retained on the shell by a separate rigid inner support ring having a peripheral edge matching a contoured edge of the shell. The seat and backrest portions of the cushion each have an outer margin secured to an interior surface of the support ring. An outer surface of the inner ring is in turn secured to the inner surface of the shell. This type of seat is commonly known as a "split shell" seat or a seat having a ring or shell within a shell.

While seats of the type disclosed in the Hill patent perform more than satisfactorily, they suffer from certain drawbacks and disadvantages. Most notably, manufacturing and assembling such a seat is a relatively complex and time consuming venture requiring considerable skilled labor and the use of several components which are themselves relatively complex and expensive to manufacture. Manufacture is complicated by the fact that the shell must be formed with forwardly protruding lances and a contoured edge terminating in a flange. Manufacture is also complicated by the fact that the inner ring must formed with rearwardly protruding tabs. During assembly, the cushion must first be aligned with and then attached to the inner ring, and the tabs on the inner ring must engage the lances on the shell so that the lances index and locate the cushion/inner ring subassembly in proper alignment with the seat pan. Releasible fasteners in the form of cap screws or the like must then be inserted to connect the inner ring to mounting recesses formed in the shell. This of course significantly complicates assembly. Assembly is further complicated by the requirement for a finish strip around the terminal flange on the contoured edge of the shell.

Other seats are known which lack the split shell or shell within a shell construction of the type disclosed in the Hill patent. Most of these seats require the direct connection of the cushion or the upholstery layer to the shell using screws, staples, or crimp edging. Such retention devices necessarily impose substantial compression or tension forces that distort the upholstery layer and/or cushion member, thereby detracting from the unitary appearance desired by many consumers and complicating assembly.

OBJECTS AND SUMMARY OF THE INVENTION

An object of the invention is to provide a seat having a unitary appearance but which lacks an inner shell or ring retaining the seat cushion on the shell.

Another object of the invention is to provide a seat of the type described above which is relatively inexpensive to manufacture and to assemble.

Yet another object of the invention is to provide a seat having one or more of the characteristics discussed above and which is relatively sturdy.

In accordance with a first aspect of the invention, these objects are achieved by providing a seat comprising a shell presenting a front surface having a channel formed therein, and a cushion presenting a rear surface having a ridge extending rearwardly therefrom. The ridge (1) has a shape which compliments that of the channel and (2) extends into the channel. Preferably, the channel extends around the entire perimeter of the front surface of the shell, and the ridge extends around the entire perimeter of the rear surface of the cushion.

Connectors are provided which retains the ridge in the channel, thereby fastening the cushion to the shell. The connectors may comprise a plurality of brads spaced around the perimeter of the seat and extending through the walls of channel and the ridge.

In order to facilitate connection of the seat to an underlying support without interference from or compression of the cushion, the shell is formed with recessed portions for receiving fasteners for connecting the seat to the support.

Still another object of the invention is to provide a seat of the type described above having effective drainage devices formed therein.

In accordance with another aspect of the invention, this object is achieved by providing a seat of the type described above and in which the channel has drain holes formed therein for the passage of water. In addition, the cushion has a drain hole formed therethrough which communicates with another drain hole in the shell.

Yet another object of the invention is to provide a method of quickly and inexpensively assembling a seat using a minimum of components and requiring minimal if any skilled labor.

Still another object of the invention is to provide a method of the type described above in which the seat components provide intrinsic alignment during assembly, thereby facilitating assembly.

Still another object of the invention is to provide a method having one or more of the characteristics described above in which the seat cushion is attached to the shell without compressing either the cushion member of the upholstery layer of the cushion.

In accordance with another aspect of the invention, the method includes providing a shell presenting a front surface, having a channel formed therein, and providing a cushion presenting a rear surface. The rear surface of the cushion has a ridge extending rearwardly therefrom which has a shape which compliments that of the channel. Subsequent steps include inserting the ridge of the cushion into the channel and connecting the ridge to a wall of the channel, thereby retaining the cushion on the shell. The inserting step preferably comprises pressing the cushion onto the shell with the ridge of the cushion and the channel in the shell mating so as to align the cushion with the shell.

The connecting step preferably comprises inserting brads through the wall of the channel and through the ridge of the cushion member. If the channel is substantially U-shaped, the connecting step preferably comprises driving the brads through a first wall of the channel, through the ridge of the cushion member, and into a second wall of the channel.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout and in which:

FIG. 2 is a perspective view of the cushion of the seat of FIG. 1, viewed from behind the cushion;

FIG. 3 is a perspective view of the shell of the seat of FIG. 1, viewed from in front of the shell;

DETAILED DESCRIPTION OF THE PREFERRED EMBODIMENTS

1. Resume

Figure 1:
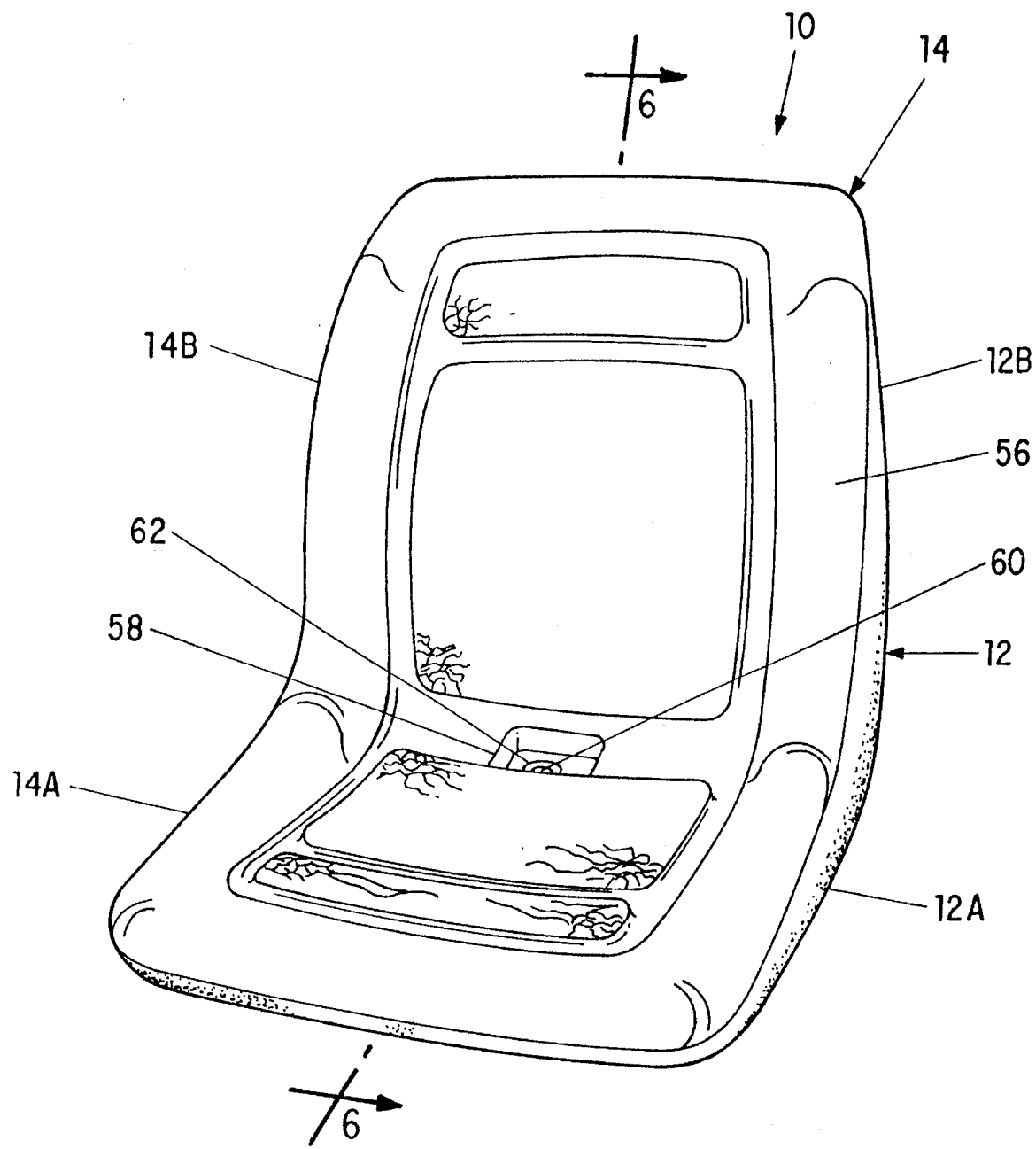
FIG. 1 is a perspective view of a vehicle seat constructed in accordance with a preferred embodiment of the invention.

Pursuant to the invention, a vehicle seat is provided having a shell and an upholstered cushion. The cushion is retained on the shell by a cushion retainer without compressing either the cushion member or the upholstery layer of the cushion and without employing any intermediate ring or shell members. The cushion retainer includes a channel formed around the perimeter of the front surface of the shell, a ridge extending rearwardly from the perimeter of the rear surface of the cushion and having a shape complimenting that of the channel in the shell, and connectors fastening the ridge of the cushion to the walls of the channel. The seat is assembled by positioning the cushion on the shell such that the ridge extends into the channel, and by attaching the ridge to the channel walls by the connectors. Both the cushion and the shell are designed to minimize fabrication expense and to facilitate connection of the seat components to one another and of the assembled seat to a fore/aft slide assembly or the like. The cushion and the shell are further designed so as to facilitate the drainage of rainwater from the seat.

2. Seat Construction

Referring now to the drawings, a vehicle seat 10 is illustrated comprising a shell 12 and a cushion 14. The shell 12 and cushion 14 are preferably formed as unitary members each including a respective seat portion 12A, 14A and backrest portion 12B, 14B. The cushion 14 is retained on the shell 12 via a retainer including connectors 18, a ridge 20 of the cushion 14, and a channel 22 in the shell 12. The seat 10 is typically connected to a fore/aft slide assembly 16 (FIG. 10) but may be mounted on any suitable support structure depending upon the application.

Figure 4:
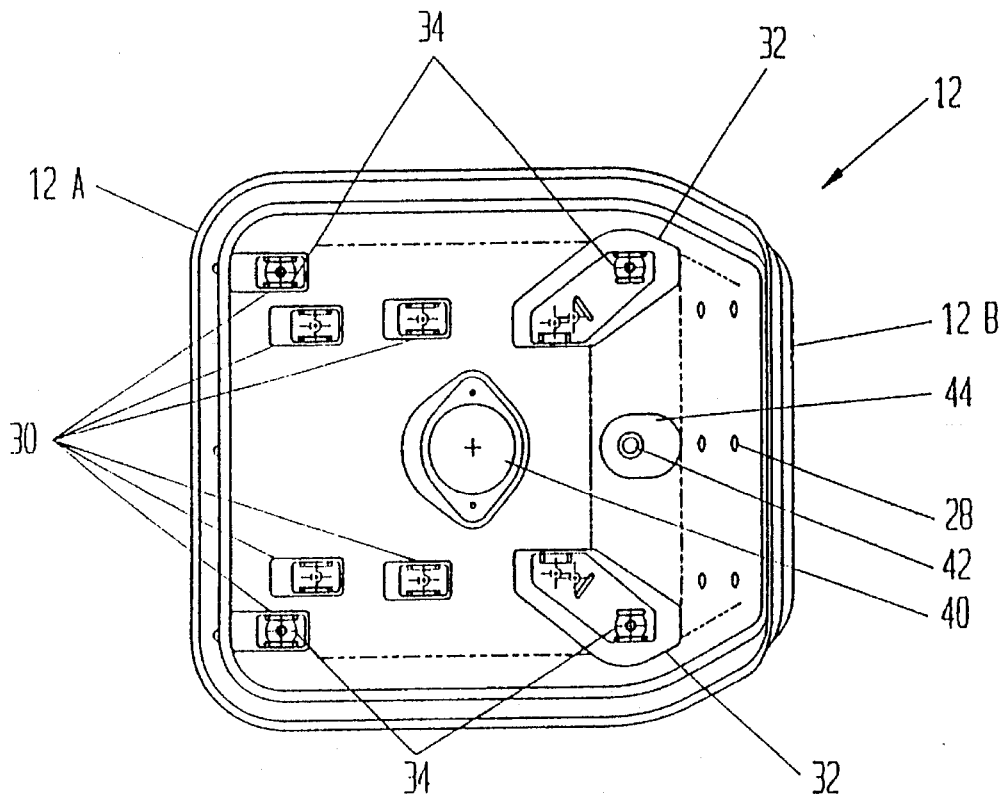
FIG. 4 is a top plan view of the shell of FIG. 3.
Figure 5:
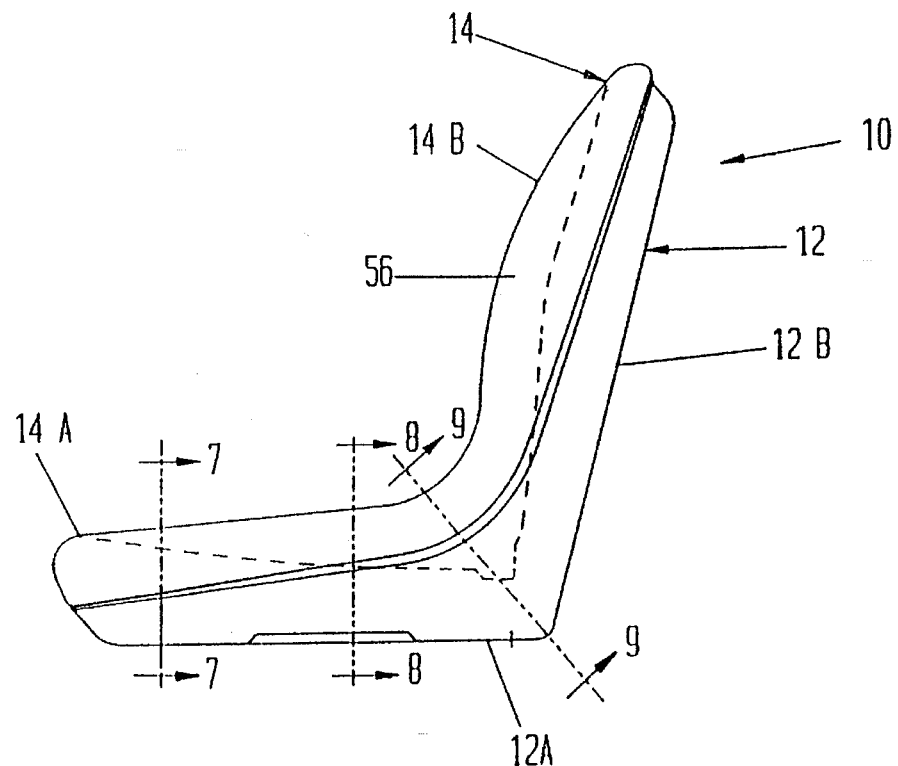
FIG. 5 is a side view of the seat of FIG. 1.
Figure 7:
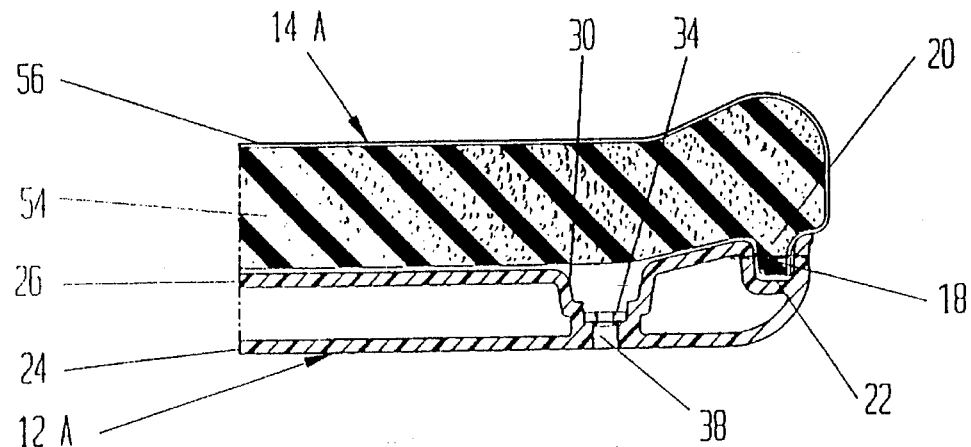
FIG. 7 is a sectional view taken along the lines 7—7 in FIG. 5 and illustrating the right-half of the seat, the left-half being identical and thus omitted to avoid duplication.
Figure 8:
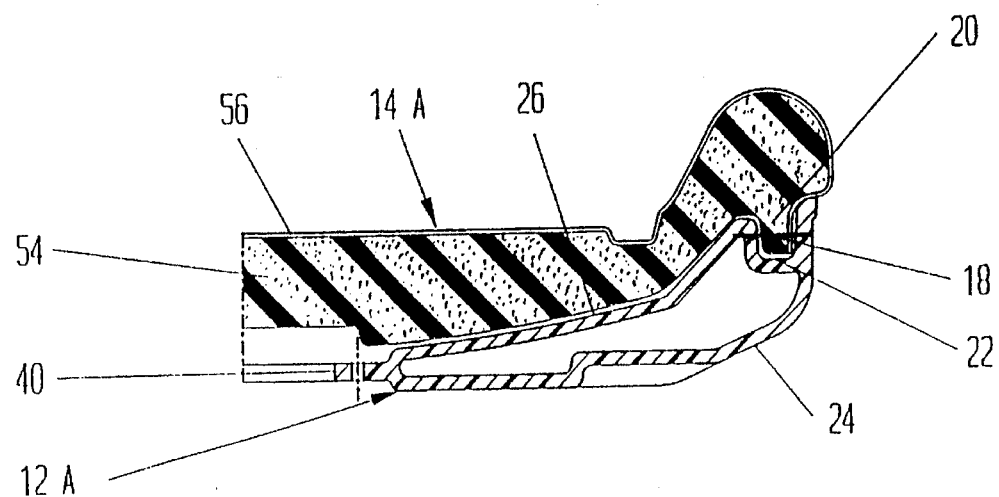
FIG. 8 is a sectional view taken along the lines 8—8 in FIG. 5 and illustrating the right-half of the seat, the left-half being identical and thus omitted to avoid duplication.
Figure 9:
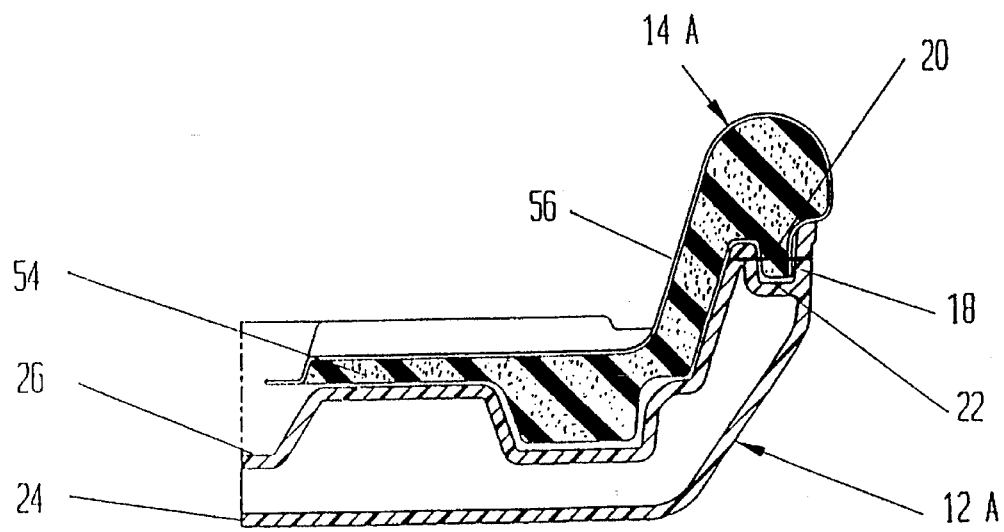
FIG. 9 is a sectional view taken along the lines 9—9 in FIG. 5 and illustrating the right-half of the seat, the left-half being identical and thus omitted to avoid duplication.
Figure 10:
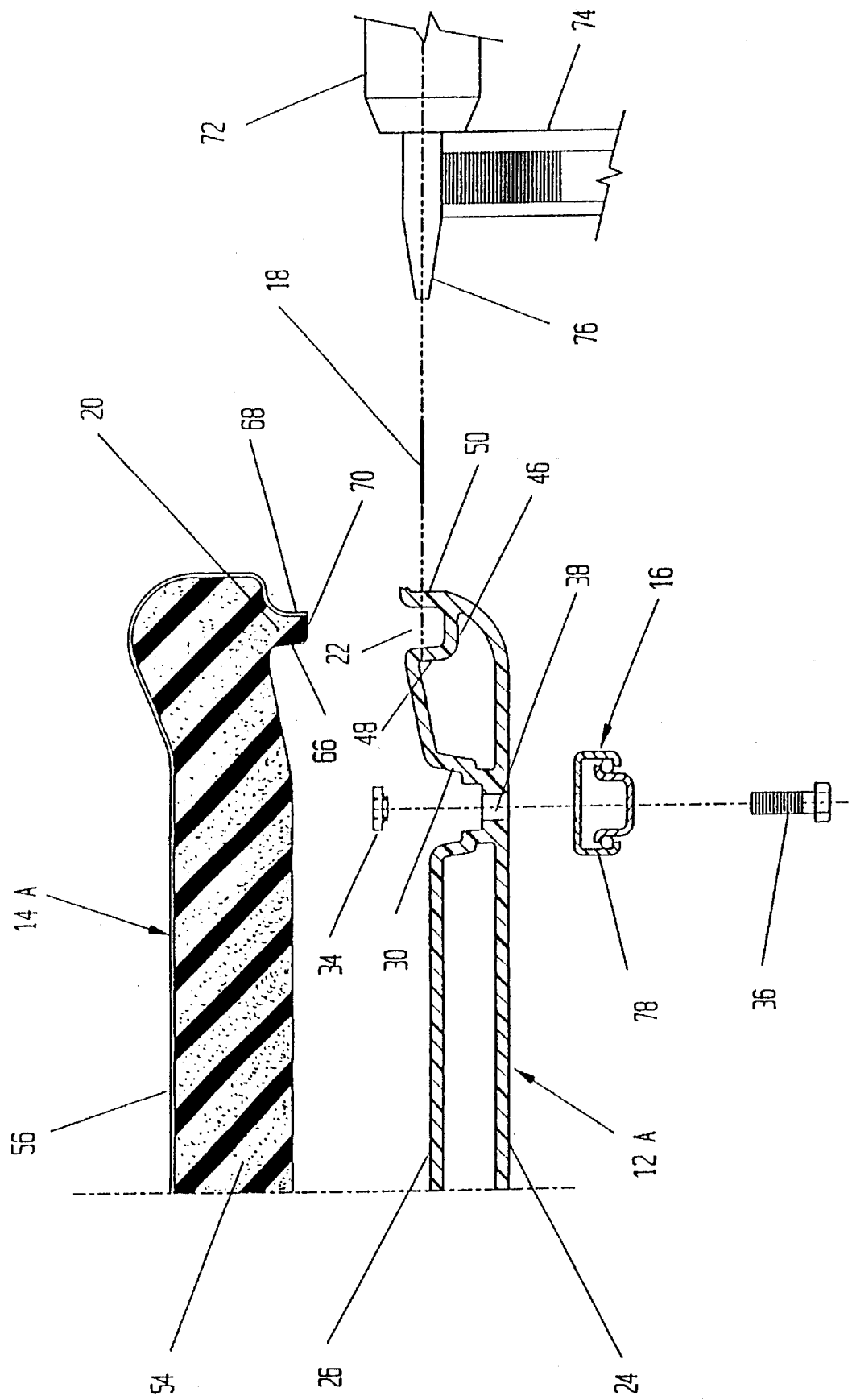
FIG. 10 is an exploded view according to FIG. 7 and illustrating a partial method of seat assembly.

The shell 12 may be constructed from any material which is sufficiently sturdy to support an occupant but, to minimize expenses and weight while maximizing adaptability, is preferably constructed from plastic, and even more preferably a blow molded thermoplastic material such as polyethylene. The shell 12 is of a double wall construction having rear and front walls 24 and 26 merging with one another at selected locations to strengthen the shell 12 such as by tack-offs 28 in the backrest portion 12B. The front surface of the seat portion 12A has several indentations 30, 32 formed therein for receiving nuts 34 (FIGS. 4, 7 and 10) permitting the connection of the seat 10 to a fore/aft slide assembly 16 or the like via bolts 36 extending through bores 38 formed through shell 12 in the areas of the indentations 30, 32 (FIG. 10). Several indentations 30, 32 are preferably spaced around the seat portion 12A to permit the ready adaption of the seat 10 for use with fore/aft slide assemblies or supports having different mounting patterns. In addition, the areas of some of the indentations such as indentations 32 are preferably sufficiently large to provide significant flexibility of nut placement within a particular indentation, thereby further accommodating different mounting patterns.

The seat portion 12A of the shell 12 has an aperture 40 formed therein for receiving an occupant detection switch or the like. A drain hole 42 is also formed in the shell 12 proximate the junction between the seat portion 12A and backrest portion 12B for the passage of rainwater, and a funnel or chute 44 is formed in the backrest portion 12B above the drain hole 42 to direct rainwater toward the drain hole 42.

Figure 6:
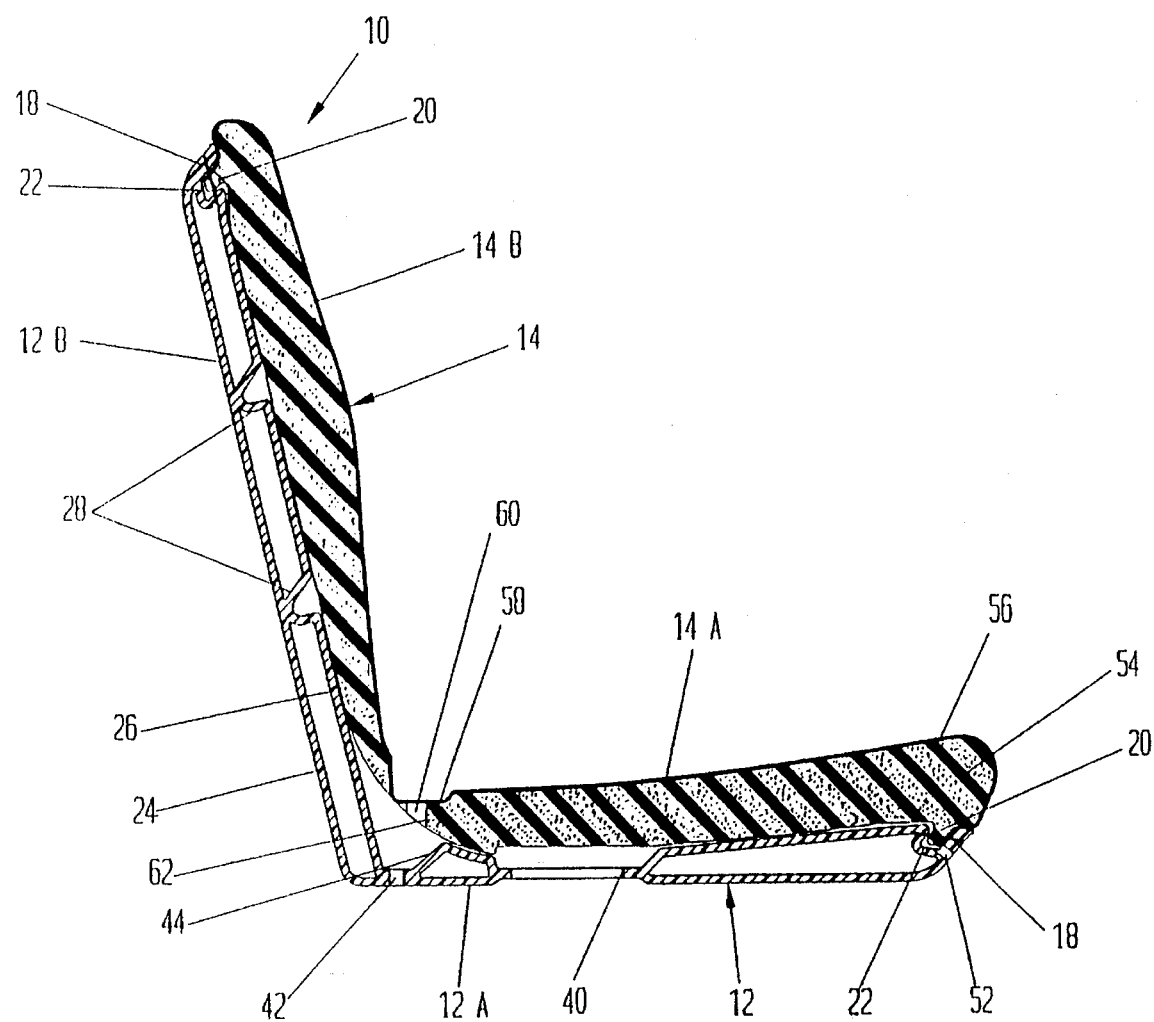
FIG. 6 is a sectional view taken along the lines 6—6 in FIG. 1.

The channel 22 is formed around the entire perimeter of the front surface of the shell 12 as illustrated but could conceivably be provided in the form of segmented channel portions spaced strategically around the perimeter. The channel 22 is substantially U-shaped and thus presents a rear base 46 and inner and outer generally parallel walls 48, 50 (FIG. 10). One or more drain holes 52 (FIG. 6) are preferably formed in low points of the channel 22 to permit rainwater or the like to drain away from the seat 10.

Channel 22 is preferably located very near the outer perimeter of the shell 12 so as to permit fasteners such as brads 18 to be driven through the channel 22 from the outside of the outer wall 50 as detailed below. However, the channel 22 could be located nearer to the center of the shell 12 if non-intrusive fasteners such as adhesives are used to connect the ridge 20 to the walls of the channel 22. The channel 22 should be sufficiently wide and deep to receive a ridge 20 which is large enough to retain the cushion 14 in place but should not be so large as to require unduly long fasteners to bridge the channel 22. The channel 22 of the illustrated embodiment is formed from ¼" thick walls and has an inner transverse width of about ½" and a depth of about ½" and thus can accommodate 1" brads as detailed below.

The cushion 14 comprises a high density molded foam rubber cushion member 54 having a layer of vinyl upholstery 56 or the like glued or otherwise affixed to the front surface thereof. A recess 58 is formed in a natural low point of cushion 14 located at the junction between the seat portion 14A and backrest portion 14B for the collection of rain water. A hole 60 is formed at the low point of the recess 58 for draining rainwater from the recess 58, and drain means are provided to direct water through the hole 60 and into the corresponding drain hole 42 in the shell 12. In the illustrated embodiment, the drain means takes the form of a tube 62 extending through the cushion 14 and having an outlet communicating with the chute 44 formed in the front surface of the shell 12.

The rear face of the cushion member 54 has a shape which generally compliments that of the front face of the shell 12 with the notable exception that for the most part protuberances complimenting the indentations 30, 32 in the shell 12 are omitted. Such protuberances could be counter-productive since one of the benefits of the recessed connectors in the shell 12 is the connection of the shell 12 to the underlying fore/aft slide assembly 16 or other support without interference from or compression of the cushion member 54. However, if desired, some protrusions 64 (FIG. 2) may be formed so as to extend into indentations 32 for further support. Such protuberances and/or the connectors 34, 36 should be dimensioned so as not to interfere with the connection of the seat 10 to the fore/aft slide assembly 16.

The ridge 20 is formed integral with and extends rearwardly from the rear face of the cushion member 54 and into the channel 22 for connection to the channel walls. The ridge 20 should be slightly smaller than the channel 22 so as to substantially fill the channel 22 while at the same time snugly fitting therein. In the illustrated embodiment, the ridge 20 has a cross section and extent complementing that of the channel 22. The ridge 20 is between ⅜" and ½" wide and ⅜" to ½" deep. The ridge 20 presents sides 66 and 68 and a rear end 70.

The connectors 18 may comprise any devices capable of securely retaining the ridge 20 of the cushion 14 in the channel 22 and preferably provide this connection without compressing the cushion 14 at least beyond the ridge 20. An adhesive could be used for this purpose but currently is not preferred because no adhesives are known to be commercially available at the present time which can assure a permanent connection of the porous foam rubber cushion member 54 to the polyethylene channel walls 48, 50. However, new adhesives are constantly being developed and gluing may ultimately prove to be a satisfactory and indeed preferred connection technique. The currently preferred connectors 18 comprise mechanical fasteners such as staples or even more preferably headless brads which are driven through the channel 22 from the outside such that the brads pierce the outer channel wall 50 and the ridge 20 and extend into the inner channel wall 48. Brads are favored because, if properly positioned so as to be flush with or slightly countersunk in the outer surface of shell 12, the outer ends can be virtually invisible to the observer. This is particularly true if the outer surface of the shell 12 is formed with dimples and if the diameter of the brads 18 is set to match the diameter of the dimples. The brads 18 should be sufficiently long to extend into or even through the inner wall 48 of the channel 22 upon insertion but should not be so long as to extend all the way through the wall 48 and into adjacent portions of the shell 12 or cushion 14. In the present case in which a ½" wide channel 22 is formed by ¼" thick walls 48 and 50, 1" brads 18 prove acceptable.

3. Seat Manufacture

The seat 10 is manufactured by first molding the plastic shell 12 and foam rubber cushion member 54 as respective integral units with a complimentary channel 22 and ridge 20. The shell 12 is blow molded with the channel 22, indentations 30, 32, and opening 40 formed therein. Care should be taken during molding to assure that the shape of the ridge 20 compliments that of the channel 22. However, due the flexibility of the foam rubber ridge 20, some tolerance is permitted. Bores 38 and holes 42 and 52 could also be formed in the shell 12 during molding but preferably are drilled after molding.

After molding, the upholstery layer 56 is connected to the cushion member 54, e.g., by gluing so as to cover all portions of the cushion member 54 which would be visible after assembly. Since the upholstery layer 56 is not used to connect the cushion 14 to the shell 12, it need not and should not extend over the rear end 70 of the ridge 20 and instead preferably extends around the sides and to the rear of the cushion member 54, onto the outer edge 68 of the ridge 20, and terminates at or adjacent to the rear end 70 of the ridge 20.

Next, nuts 34 are clipped, glued, or otherwise attached to the shell indentations 30 and 32 in appropriate locations, and the cushion 14 is then mounted on the shell 12 either manually or via a machine such that the ridge 20 projects into the channel 22 and such that the end of the tube 62 is aligned with the chute 44 in the shell 12. The complimentary shapes of the ridge 20 and the channel 22 provide intrinsic alignment during this mounting, thereby significantly facilitating assembly. This presents a marked improvement over most prior art seat designs which require significant pre-alignment and thus require employment of more highly skilled laborers and/or a more complex machines.

After the cushion 14 is mounted on the shell 12 with the ridge 20 pressed into the channel 22, the cushion 14 is retained on the shell 12 via connectors such as the brads 18 discussed above. The brads 18 are driven through the outer wall 50 of the channel 22, the ridge 20, and into the inner wall 48 of the channel 22 so as to pierce the upholstery layer 56 and ridge 20 without compressing either the upholstery layer 56 or the cushion member 54, thus adding to the unitary appearance of the seat 10. The location of each brad 18 and the number of brads 18 to be inserted is set so as to optimize cushion retention and will vary from application to application. In the illustrated embodiment, sixteen brads 18 are spaced more or less evenly around the perimeter of the seat 10.

The brads 18 could be inserted manually via a hammer but are preferably driven by a suitable pneumatic gun 72 as illustrated in FIG. 10 having a magazine 74 and an application tip 76. Since the inventive channel/ridge structure permits significant flexibility in connection, precise positioning of the gun 72 prior to operation is not required. Rather, it is only necessary that the gun 72 be positioned generally perpendicularly to the outer wall 50 of the channel 22 so as to assure that the brad 18 bridges the channel 22 and enters the inner wall 48 as illustrated in the drawings. In a particularly preferred operation, all brads 18 are inserted simultaneously via a plurality of automatically operated guns 72 mounted around a stationary platform on which the shell 12 is supported. Alternatively, the shell 12 could be mounted on a spinning platform, and an operator could apply the brads 18 in sequence using a single gun 72.

Finally, the seat 10 is attached to fore/aft slide assembly 16 by bolts 36 or the like as illustrated in FIG. 10. This mounting only requires that the bolts 36 be inserted through fore/aft slide track 78 and any intermediate spacers, through the bores 38 in the shell 12, and into mating engagement with the nuts 34. This connection is not hindered by cushion member 54 nor does it result in compression of the cushion member 54. The now assembled seat 10 presents a unitary appearance in which no exterior connectors are visible and in which neither the cushion member 54 nor the upholstery layer 56 mounted thereon is compressed. Yet, the cushion 14 is securely retained on the shell 12 and can be removed from the shell 12 only if the connectors 18 are removed or if the cushion 14 is physically and with great difficulty ripped away from the shell 12 such that the ridge 20 is destroyed in the vicinity of the connectors 18.

In use, rainwater or the like falling on the seat 10 drains either toward the central recess 58 of the cushion 14 or toward the outer perimeter of the cushion. Water running toward the central recess 58 drains through the tube 62 and out of the drain hole 42 in the shell 12. Water running toward the outer perimeter runs either off the edge of the seat 10 or into the channel 22, where it drains from the channel 22 via the drain holes 52. This deters water from saturating the foam rubber cushion member 54.

Many changes and modifications could be made to the invention without departing from the spirit thereof. The scope of such changes will become apparent from the appended claims.

I claim:

1. A seat comprising:

(A) a shell presenting a front surface, said front surface of said shell having a channel formed therein, said channel including an inner wall and an outer wall and having a first shape;

(B) a cushion presenting a rear surface, said rear surface of said cushion having a ridge extending rearwardly therefrom, said ridge (1) having a second shape which compliments said first shape of said channel and (2) extending into said channel; and (c) a plurality of mechanical fasteners, each of said plurality of mechanical fasteners extending through said outer wall of said channel, through said ridge and into said inner wall of said channel, thereby retaining said cushion on said shell, wherein each of said plurality of mechanical fasteners does not extend all the way through said inner wall.

2. The seat as defined in claim 1, wherein said channel has a depth of about ½ inch and a cross-sectional width of about ½ inch and said inner wall is parallel with said outer wall.

3. The seat as defined in claim 1, wherein said shell has a drain hole formed therethrough for the passage of water, and wherein said cushion has a drain hole formed therethrough for the passage of water, said drain hole of said cushion communicating with said drain hole of said shell.

4. The seat as defined in claim 1, wherein said plurality of mechanical fasteners comprise a plurality of brads spaced around a perimeter of said seat.

5. The seat as defined in claim 1, wherein said shell is formed from a blow molded thermoplastic material.

6. The seat as defined in claim 1, wherein said shell is formed with recessed portions for receiving fasteners for connecting said seat to a support.

7. The seat as defined in claim 1, wherein said channel extends around the entire perimeter of said front surface of said shell and said ridge extends around the entire perimeter of said rear surface of said cushion.

8. The seat as defined in claim 7, wherein said channel has drain holes formed therethrough for the passage of water.

9. A seat comprising:

(A) a shell presenting a front surface, said front surface of said shell having a channel formed therein extending around the entire perimeter thereof, said channel having a first shape;

(B) a cushion including a cushion member presenting a rear surface, said rear surface of said cushion member having a ridge extending rearwardly therefrom, said ridge (a) having a shape which compliments that of said channel and (b) extending into said channel; and (C) a plurality of brads spaced around at least a portion of a perimeter of said seat, each of said plurality of brads extending through a wall of said channel and through said ridge, thereby retaining said cushion on said shell.

10. A seat comprising:

(A) a shell presenting a front surface, said front surface of said shell having a channel formed therein extending around at least a substantial portion of the perimeter thereof, said channel including an inner wall, a rear base and an outer wall and having a U-shape;

(B) a cushion presenting a rear surface, said rear surface of said cushion having a ridge extending rearwardly therefrom, said ridge (1) having a shape which compliments said U-shape of said channel and (2) extending into said channel; and (C) a plurality of mechanical fasteners, each of said plurality of mechanical fasteners extending through said outer wall of said channel, through said ridge and into said inner wall of said channel, thereby retaining said cushion on said shell, wherein each of said plurality of mechanical fasteners does not extend all the way through said inner wall.

11. The seat as defined in claim 10, wherein said plurality of mechanical fasteners comprises a plurality of brads spaced around a perimeter of said seat.

12. A seat comprising:

(A) a shell including a front surface, said front surface of said shell including a channel formed in said shell, said channel including an inner wall, a rear base and an outer wall and defining a U-shape;

(B) a cushion including a rear surface, said rear surface of said cushion including a ridge extending rearwardly from said cushion, said ridge (1) defining a shape which compliments said U-shape of said channel and (2) extending into said channel; and (C) mechanical fasteners which extend through said outer wall of said channel, through said ridge and into said inner wall of said channel so as to retain said ridge in said channel, thereby retaining said cushion against said shell, wherein said mechanical fasteners do not extend all the way through said inner wall.

13. The seat as defined in claim 12, wherein said channel has a depth of about ½ inch and a cross-sectional width of about ½ inch and said inner wall is parallel with said outer wall.

14. The seat as defined in claim 12, wherein said shell includes a drain hole formed therethrough for the passage of water, and wherein said cushion includes a drain hole formed therethrough for the passage of water, said drain hole of said cushion communicating with said drain hole of said shell.

15. The seat as defined in claim 12, wherein said mechanical fasteners comprise a plurality of brads spaced around a perimeter of said seat.

16. The seat a defined in claim 12, wherein said shell is formed with recessed portions for receiving fasteners for connecting said seat to a support.

17. The seat as defined in claim 12, wherein said channel extends around an entire perimeter of said front surface of said shell and said ridge extends around an entire perimeter of said rear surface of said cushion.

18. The seat as defined in claim 17, wherein said channel includes at least one drain hole formed therethrough for the passage of water.

19. A seat comprising:
   (A) a shell including a front surface, said front surface of said shell including a channel formed in said shell, said channel (1) extending around at least a substantial portion of a perimeter of said shell, (2) including an inner wall and an outer wall and (3) defining a first shape;
   (B) a cushion including a rear surface, said rear surface of said cushion including a ridge extending rearwardly from said cushion, said ridge (1) extending around at least a substantial portion of a perimeter of said cushion, (2) defining a second shape which compliments said first shape of said channel and (3) extending into said channel along at least a substantial portion of said perimeter of said shell; and
   (C) mechanical fasteners which extend through said outer wall of said channel, through said ridge and into said inner wall of said channel so as to retain said ridge in said channel, thereby retaining said cushion against said shell,
   wherein said mechanical fasteners do not extend all the way through said inner wall.

20. The seat as defined in claim 19, wherein said mechanical fasteners comprise a plurality of brads spaced around a perimeter of said seat.

* * * * *